April 4, 1967    J. G. KUHN    3,312,007
DISPLAY DEVICE FOR TIRES
Filed Jan. 20, 1966    2 Sheets-Sheet 1

INVENTOR.
JOHN G. KUHN
BY Donald R. Johnson
ATTORNEY

April 4, 1967 J. G. KUHN 3,312,007
DISPLAY DEVICE FOR TIRES
Filed Jan. 20, 1966 2 Sheets-Sheet 2

INVENTOR.
JOHN G. KUHN
BY Donald R. Johnson
ATTORNEY

United States Patent Office 3,312,007
Patented Apr. 4, 1967

3,312,007
DISPLAY DEVICE FOR TIRES
John G. Kuhn, Lansdowne, Pa., assignor to Sun Oil Company, Philadelphia, Pa., a corporation of New Jersey
Filed Jan. 20, 1966, Ser. No. 521,789
6 Claims. (Cl. 40—125)

This invention relates to a novel display device for tires, and more particularly to a novel device made of sheet metal (or other rigid sheet material) which provides panels for advertising copy and which is designed to be detachably secured to tires.

Conventionally, advertising displays in connection with tires have invariably utilized a circular planar panel or disc which fits within and is secured within the central opening of the tire; such a disc lies essentially in the plane of one side face of the tire, or is closely parallel to such plane. The display or advertising area (copy space) available on a disc panel is somewhat limited, being of course limited by the diameter of the tire opening (which may, for example, be about sixteen inches). Also, since the prior, conventional disc display device is in a (single) plane parallel to the side face of the tire, or in the plane of this face, it is readable only from a 90° angle, or at most from a 45° angle, both referring to the angle between the line of sight and the side face of the tire. This, of course, limits the range of effectiveness of such prior display device. Furthermore, it of course cannot be used as a top-of-stack sign, that is, as a sign atop a stack of tires.

An object of this invention is to provide a novel display device for tires.

Another object is to provide a display device for tires which provides, as compared to prior display devices, a greatly increased display space, a substantially greater field of effectiveness, and increased utility.

The objects of this invention are accomplished, briefly, in the following manner: a unitary substantially rectangular blank, of a suitable rigid sheet material such as sheet metal, has a length considerably in excess of the O.D. of a tire with which the device is to be used. This blank is bent along certain lines to form the display device. It is bent centrally along a line parallel to the shorter sides of the rectangle to provide two planar advertising panels whose planes intersect each other (at the central bend line) at a substantial angle and extend outwardly (at opposite sides of the tire) at acute angles from one side face of the tire. The end portions of the blank are bent to provide two opposite end panels which overlie the side face of the tire and extend substantially parallel thereto. To retain the device in place on the tire, two end tabs extend from respective ends of the rectangular portion of the blank, and these tabs are bent into a U-shape to embrace the bead of the tire, at two diametrically-opposite locations on the tire.

A detailed description of the invention follows, taken in conjunction with the accompanying drawings, wherein.

Figure 1:
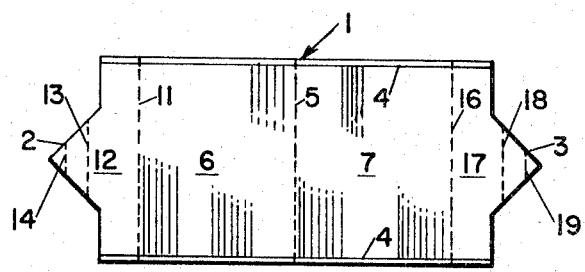
FIG. 1 is a plan view of a sheet metal blank used to form the display device of the invention.

First referring to FIG. 1, the tire display device of this invention is formed from a unitary substantially rectangular blank 1 of a rigid yet bendable sheet material, such as light-weight sheet metal. The main portion of the blank is rectangular, but at each of its two ends (and centered along the respective shorter side of the rectangle) it has an integral outwardly-projecting narrow tab (indicated at 2 and 3 in FIG. 1) which is substantially triangular in shape. By way of example, the blank may have an overall length (including the tabs) of about 48 inches and a width of about 13 inches. The rectangular portion of the blank may have dimensions of about 41" x 13". To make the blank safer to handle, the material along the top and bottom edges thereof is doubled over by rolling, as indicated at 4, to provide a narrow double-ply edge portion at the top and bottom of the blank.

The blank 1 is adapted to be bent centrally thereof along a line 5 which is parallel to the shorter sides of the rectangle (and perpendicular to the longer sides of the rectangle) to provide two planar advertising panels 6 and 7 which are rectangular in shape, each panel having dimensions of about 13" x 15". To assist in this bending, the material of the blank 1 is crimped in the direction of line 5, in the region of the two rolled edges 4. The panels 6 and 7 are adapted for display of advertising material or copy thereon, the copy being for example lithographed on the material of the blank. Speaking generally, the advertising copy placed on the two panels 6 and 7 would be different. Thus, Copy A is placed on panel 6, and Copy B on panel 7. Also, in general, the advertising copy would be placed on the faces of the panels 6 and 7 opposite to those illustrated in FIG. 1, so that, when looking at the advertising copy, the rolled-over edges 4 would be on the back side and would not be visible.

Figures 2, 3:
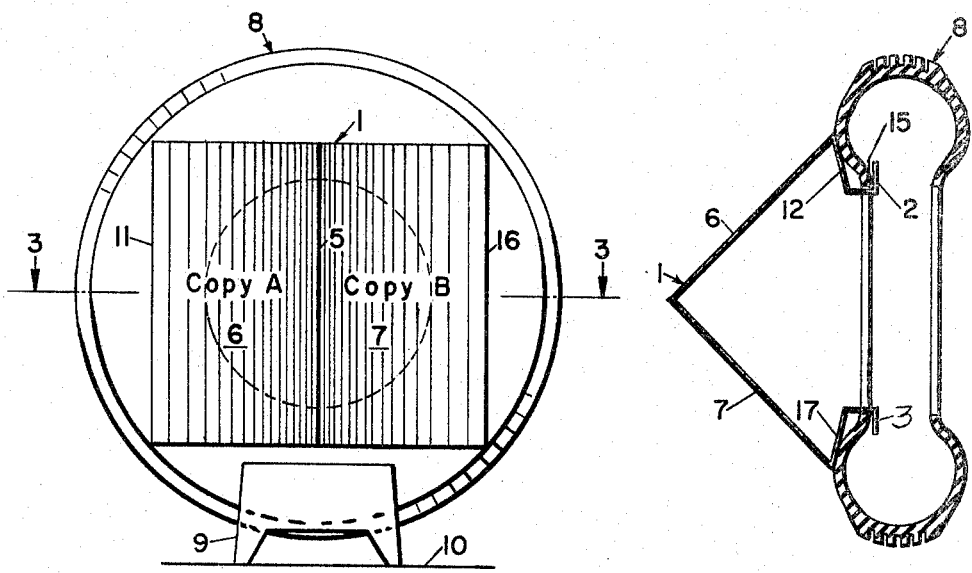
FIG. 2 is a front elevation of an individual automotive tire in display position, showing the display device of the invention in attached relation thereto.
FIG. 3 is a sectional view taken substantially on the line 3—3 of FIG. 2.

Refer now to FIGS. 2 and 3, which illustrate the display device formed from the blank of FIG. 1 in relation to an individual automotive tire in display position. The tire 8 is supported for display purposes in an upright position wherein its side faces lie in substantially vertical planes, by means of a stand 9 of the usual type which rests on the ground 10 or other substantially horizontal supporting surface. Assuming that the display device has been shipped or transported to a point of use in flat condition, substantially as indicated in FIG. 1, it is bent along the line 5 so that the planes of the advertising panels 6 and 7 form a substantial angle (approximately 90°, or more) along their line of intersection, as shown in FIG. 3. It is pointed out that the diameter of the central opening of the tire determines the approximate angle of intersection of the planes of panels 6 and 7. Referring again to FIG. 1, the blank 1 is bent, adjacent one end of the rectangle, along a line 11 parallel to the shorter sides of the rectangle to provide an end panel 12. Again, to assist in this bending, the material of the blank 1 is crimped in the direction of line 11, in the region of the two rolled edges 4. The end panel 12 is bent away from the plane of advertising panel 6 in such a direction that the end of panel 12 which is opposite to line 11 extends generally toward line 5; the plane of end panel 12 forms an acute angle with the plane of panel 6 and end panel 12 is bent to overlie one side face of the tire 8 and to extend substantially parallel to this side face, as illustrated in FIG. 3. When end panel 12 is placed in position against the side face of the tire 8, the advertising panel 6 will extend outwardly at an acute angle from the side face of the tire 8.

The integral tab 2 previously described is joined onto that end of panel 12 which is opposite to line 11. As just described, when arranging the display device for mounting on a tire, the end panel 12 is bent to overlie one side face of the tire and to extend substantially parallel to this side face. This brings the narrow tab 2, which is centrally located along one of the shorter sides of the rectangle and is somewhat triangular in shape, to a position adjacent to the central circular opening of the tire 8. In order to secure the display device to tire 8, the tab 2 is bent along a pair of lines 13 and 14 (see FIG. 1) into a U-shape, to embrace both sides of the bead 15 of tire 8; as will be seen in FIG. 3, tab 2 extends into and through the central opening of the tire, and the free or pointed end of this tab is bent back toward the plane of panel 12, to engage the inner surface of bead 15, at one side of the tire 8.

A manipulation similar to that described is carried out at the other end of blank 1. The blank is bent, adjacent the other end of the rectangle, along a line 16 parallel to the shorter sides of the rectangle to provide an end panel 17. The material of the blank 1 is crimped in the direction of line 16, in the region of the two rolled edges 4. The end panel 17 is bent away from the plane of advertising panel 7 in such a direction that the end of panel 17 which is opposite to line 16 extends generally toward line 5; the plane of end panel 17 forms an acute angle with the plane of panel 7 and end panel 17 is bent to overlie one side face of tire 8 and to extend substantially parallel to this side face (see FIG. 3). When end panel 17 is placed in position against the side face of tire 8, the advertising panel 7 will extend outwardly at an acute angle from the side face of tire 8.

The integral tab 3 previously described is joined onto that end of panel 17 which is opposite to line 16. Bending of end panel 17 as described brings the narrow tab 3, which is centrally located along one of the shorter sides of the rectangle and is somewhat triangular in shape, to a position adjacent the central circular opening of tire 8, at a location more or less diametrically opposite to tab 2. Tab 3 is bent along a pair of lines 18 and 19 (see FIG. 1) into a U-shape, to embrace both sides of the tire bead 15.

It will be seen, from the foregoing, that tabs 2 and 3 tightly engage the tire bead 15 at diametrically opposite regions thereof and, since these tabs are integral portions of the blank 1, serve to firmly secure or attach the display device to tire 8.

As previously described, and as illustrated in FIG. 3, the planar advertising panels 6 and 7 extend outwardly from one side face of the tire 8. As a result, the copy on either of these panels can be read easily by persons located on either side of the center line of the tire, even when they are practically in line with the tire tread. This is in sharp contrast to the conventional circular tire insert (placed within the central opening of the tire), which directs its message only to a person reading it from a 90° angle, or at most from a 45° angle, both referring to the angle between the line of sight and the side face of the tire. Also, since the advertising panels 6 and 7 extend outwardly away from the side face of the tire, no deep, dark shadows can cover these panels, and it is very easy to keep the panels fully illuminated, both during daylight hours and at night, under artificial illumination.

As previously stated, the copy area of the display device of the present invention (to wit, the overall area of the two advertising panels 6 and 7) may have dimensions of about 30" x 13", which gives 390 square inches of display area. In contrast, the conventional, circular tire display insert has a diameter of about 16 inches, which gives it about 201 square inches of display area. Thus, it may be seen that the display device of the present invention, in comparison with prior devices, affords not only much more display area, but visibility to a wider angular field of viewers.

Because of the protruding, three-dimensional arrangement of the display device described, it is possible for the copy on one or both of the advertising panels to make direct visual reference (as by arrows, etc.) to specific quality-areas of the tire to which it is attached (e.g., body, plies, tread). This is obviously not possible with the conventional circular tire insert, which fits within the central opening of the tire.

Figure 4:
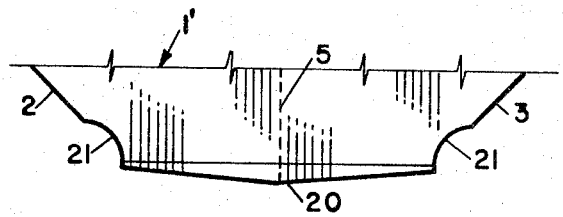
FIG. 4 is a partial plan view of a modified sheet metal blank.

Refer now to FIG. 4, which is a partial view similar to FIG. 1 but illustrating a modified (and preferred) construction of the blank. To make the overall shape of the display device more pleasing to the eye, the upper edge of the blank 1' may be made pyramidal in shape, as indicated at 20, rather than straight as in FIG. 1, the depth dimension of the blank in FIG. 4 being about 15 inches, at the central bend line 5. Also, instead of the sharp corners at the ends of the blank in FIG. 1, the blank 1' may be cut at all four corners along arcuate lines to the inner ends of the tabs 2 and 3, as indicated at 21. These curved corners 21 are made to match the contour of the tire, so that the display device will be easier to fit to the tire, and will be more secure.

Referring back to FIG. 1, it is possible to let the rolled top and bottom edges 4 show on the face of the display device, instead of concealing them on the reverse side (as was described previously). In this case, these rolled edges could be converted to channels for holding removable cardboard placards or posters carrying the advertising copy (which placards would be used when the copy lithographed on the advertising panels 6 and 7 becomes worn, or out-dated).

Figure 5:
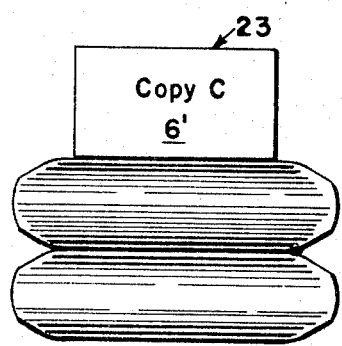
FIG. 5 is a front elevation of another type of tire display utilizing the display device of this invention.

At those points on a service station driveway or along the curb where two-way exposure to a tire stack sign is desired, the "three-dimensional" display device of the invention may be used as a top-of-stack sign, that is, as a sign on top of a vertical stack of tires. This is illustrated in FIG. 5. The display device of the invention is attached to the uppermost one of a stack 22 of tires, in the same manner as described in connection with FIG. 3. However, in this case the display device 23 has its copy (legended as Copy C, on advertising panel 6') reading from left to right along the 13-inch dimension of the blank (rather than reading from left to right along the 15-inch width of each of the panels 6 and 7, which is the case in FIG. 2). If the rolled edges of the blank were converted to panels for holding removable cardboard posters, as mentioned previously, such posters or signs could be printed on two sides to provide copy on one side usable in the position of FIG. 2 and on the reverse side usable in the position of FIG. 5.

Figure 6:
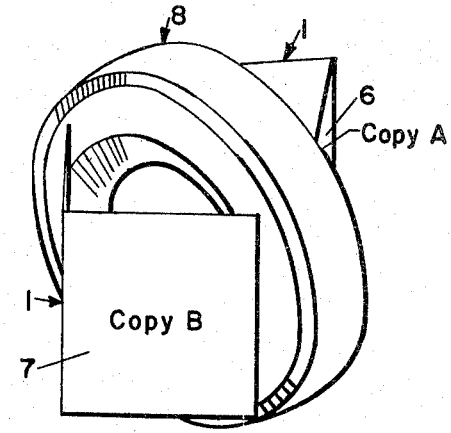
FIG. 6 is a side elevation of still another type of individual tire display.

As illustrated in FIG. 6, two of the "three-dimensional" display devices 1 can be used, one on each side of an individual tire 8, to provide a box-in-tire effect which can be seen from all directions.

Figure 7:
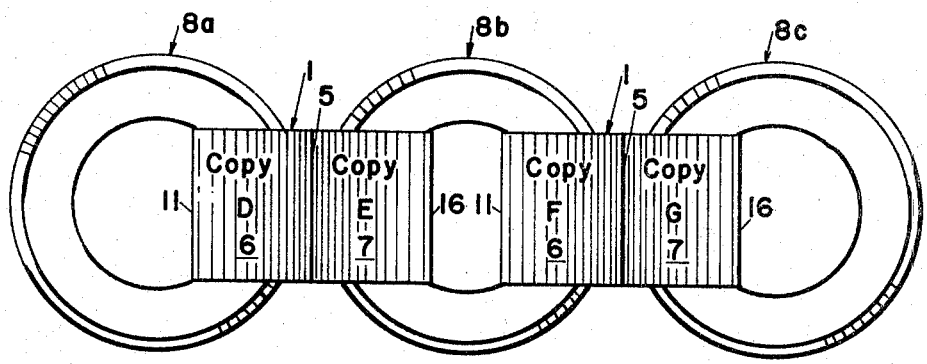
FIG. 7 is a front elevation of yet another type of tire display.

The device of this invention is usable not merely as a display device for an individual tire. It can be used to tie two tires together, or, as shown in FIG. 7, to tie three tires together in a tandem display arrangement. In FIG. 7, a display device 1 is used to tie together tires 8a and 8b, and another display device 1 is used to tie together tires 8b and 8c. In this tandem setup, the blanks 1 would have to be bent somewhat differently from that previously described in connection with FIGS. 1–3. In the case of FIG. 7, the end panel 12 of the left-hand device 1 would be bent at an acute angle to panel 6, in such a direction as to pass into the hole of tire 8a at the right-hand side thereof. Thus, panel 12 would be hidden, in FIG. 7. Likewise, the end panel 17 of the left-hand device 1 would be bent at an acute angle to advertising panel 7, in such a direction as to pass into the hole of tire 8b at the left-hand side thereof. Since panel 17, like panel 12, is thus bent backwardly, it is hidden in FIG. 7. End panels 12 and 17 of the right-hand device 1 are bent similarly, this latter end panel 12 passing into the hole of tire 8b at the right-hand side thereof and the latter end panel 17 passing into the hole of tire 8c, at the left-hand side thereof.

The tandem arrangement of FIG. 7 lends itself particularly to a four-part running message, indicated in this figure by the legends (on panels 6 and 7) reading, from left to right: Copy D, Copy E, Copy F, and Copy G.

In FIG. 7, the end tabs 2 and 3 of the blanks 1 would be bent backwardly, at acute angles to the respective end panels 12 and 17, into firm engagement with the beads of the tires. Thus, tab 2 of the left-hand device 1 would engage the bead of tire 8a, at the right-hand side thereof; tab 3 of the left-hand device 1 would engage the bead of tire 8b, at the left-hand side thereof; tab 2 of the right-hand device 1 would engage the bead of tire 8b, at the right-hand side thereof; and tab 3 of the right-hand device 1 would engage the bead of tire 8c, at the left-hand side thereof.

It will be appreciated that, in both FIGS. 6 and 7, stands similar to stand 9 (previously described) would ordinarily be used for each individual tire, to support these tires in upright positions. For simplicity, these are not shown in the drawings.

The invention claimed is:

1. A display device for tires comprising a unitary substantially rectangular blank of rigid sheet material which provides two planar advertising panels which extend outwardly at acute angles from one side face of the tire and whose planes intersect each other at a substantial angle, said blank having at each end a respective integral tab formed into a U-shape for embracing both sides of the bead of the tire at said side face.

2. A display device for tires comprising a unitary substantially rectangular blank of rigid sheet material which provides two planar advertising panels which extend outwardly at acute angles from one side face of the tire and whose planes intersect each other at a substantial angle, said blank having, at the end of each panel opposite to the intersection, a respective planar integral end panel which overlies said side face and extends substantially parallel thereto; said blank also having, at the end of each end panel opposite to its juncture with its corresponding advertising panel, a respective integral tab formed into a U-shape for embracing both sides of the bead of the tire at said side face.

3. A display device for tires comprising a unitary substantially rectangular blank formed from a rigid sheet material, the blank being adapted to be bent centrally along a line parallel to the shorter sides of the rectangle to provide two planar advertising panels, which extend outwardly at acute angles from one side face of the tire and whose planes intersect each other at a substantial angle; blank having at each end a respective integral tab adapted to be bent into a U-shape for embracing both sides of the bead of the tire at said side face.

4. A display device for tires comprising a unitary substantially rectangular blank formed from a rigid sheet material, the blank being adapted to be bent centrally along a line parallel to the shorter sides of the rectangle to provide two planar advertising panels which extend outwardly at acute angles from one side face of the tire and whose planes intersect each other at a substantial angle; the blank being adapted to be bent, adjacent each of the two ends of the rectangle, along lines parallel to the shorter sides of the rectangle to provide a pair of opposite end panels which overlie said face and which extend substantially parallel thereto; said blank having at each end a respective integral tab adapted to be bent into a U-shape for embracing both sides of the bead of the tire at said side face.

5. A display device for tires comprising a unitary substantially rectangular blank formed from a rigid sheet material, the length of the longer sides of the rectangle being considerably in excess of the O.D. of a tire with which the display device is intended to be used; the blank being adapted to be bent centrally along a line parallel to the shorter sides of the rectangle to provide two planar advertising panels, which extend outwardly at acute angles from one side face of the tire and whose planes intersect each other at a substantial angle; said blank having at each end thereof a respective integral outwardly-projecting narrow tab, each tab being centrally located along a respective one of the shorter sides of the rectangle; the two tabs each being adapted to be bent into a U-shape for embracing both sides of the bead of the tire at said side face.

6. A display device for tires comprising a unitary substantially rectangular blank formed from a rigid sheet material, the length of the longer sides of the rectangle being considerably in excess of the O.D. of a tire with which the display device is intended to be used; the blank being adapted to be bent centrally along a line parallel to the shorter sides of the rectangle to provide two planar advertising panels, which extend outwardly at acute angles from one side face of the tire and whose planes intersect each other at a substantial angle; the blank being adapted to be bent, adjacent each of the two ends of the rectangle, along lines parallel to the shorter sides of the rectangle to provide a pair of opposite end panels which overlie said face and which extend substantially parallel thereto; said blank having at each end thereof a respective integral outwardly-projecting narrow tab, each tab being centrally located along a respective one of the shorter sides of the rectangle; the two tabs each being adapted to be bent inwardly from the respective end panels for engaging the bead of a tire.

References Cited by the Examiner

UNITED STATES PATENTS

| 1,102,001 | 6/1914 | Cobourn | 40—125 |
| 1,592,196 | 7/1926 | Ganz | 40—124.1 |
| 2,077,690 | 4/1937 | Harrison | 40—125 |
| 2,517,884 | 8/1950 | Kies | 40—125 |
| 2,984,031 | 5/1961 | Giesecke | 40—124.1 X |
| 3,193,958 | 7/1965 | Huey | 40—125 |

FOREIGN PATENTS 1,087,805   7/1954   France.

EUGENE R. CAPOZIO, *Primary Examiner.*

H. F. ROSS, *Assistant Examiner.*